(12) United States Patent
Stevens et al.

(10) Patent No.: US 12,050,279 B2
(45) Date of Patent: *Jul. 30, 2024

(54) DOPPLER NULLING SPATIAL AWARENESS (DNSA) SOLUTIONS FOR NON-TERRESTRIAL NETWORKS

(71) Applicant: Rockwell Collins, Inc., Cedar Rapids, IA (US)

(72) Inventors: James A. Stevens, Lucas, TX (US); Naveen Rajanikantha, Marion, IA (US); Eric J. Loren, North Liberty, IA (US); William B. Sorsby, Cedar Rapids, IA (US); Tj T. Kwon, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,808

(22) Filed: May 19, 2023

(65) Prior Publication Data

US 2023/0305094 A1 Sep. 28, 2023

Related U.S. Application Data

(63) Continuation of application No. 18/198,671, filed on May 17, 2023, which is a continuation-in-part of
(Continued)

(51) Int. Cl.
*H04W 56/00* (2009.01)
*G01S 5/00* (2006.01)
(Continued)

(52) U.S. Cl.
CPC .......... *G01S 5/0027* (2013.01); *G01S 13/583* (2013.01); *G01S 13/62* (2013.01);
(Continued)

(58) Field of Classification Search
CPC ........ H04W 56/0035; H04W 56/0015; H04W 56/005; G01S 5/0027; G01S 13/62
See application file for complete search history.

(56) References Cited

U.S. PATENT DOCUMENTS

| | | |
|---|---|---|
| 3,025,519 A | 3/1962 | Brown et al. |
| 4,134,113 A | 1/1979 | Powell |

(Continued)

FOREIGN PATENT DOCUMENTS

| | | |
|---|---|---|
| CN | 101330448 A | 12/2008 |
| CN | 101465793 A | 6/2009 |

(Continued)

OTHER PUBLICATIONS

U.S. Appl. No. 17/233,107, filed Apr. 16, 2021, Eric J. Loren.
(Continued)

*Primary Examiner* — Dominic E Rego
(74) *Attorney, Agent, or Firm* — Suiter Swantz IP (57) ABSTRACT

A system includes at least a transmitting (Tx) and receiving (Rx) node of a non-terrestrial network (NTN) including one or more non-terrestrial nodes (e.g., operating in earth orbit or extra-terrestrial space). Each node may include a communications interface with antenna elements and a controller, which may include one or more processors and have information of own-node velocity and own-node orientation relative to a common reference frame. Each node may be time synchronized to apply Doppler corrections associated with the node's own motions relative to the common reference frame. Based on the Doppler corrections, each node may determine a relative bearing to the other node. The non-terrestrial node is configured for operation on a non-terrestrial platform (e.g., a satellite in earth orbit), which may be an extra-terrestrial platform operating in spaceflight (Continued)

beyond the earth's atmosphere or in association with a non-Earth solar system object.

17 Claims, 3 Drawing Sheets

Related U.S. Application Data application No. 18/198,152, filed on May 16, 2023, which is a continuation-in-part of application No. 18/196,786, filed on May 12, 2023, and a continuation-in-part of application No. 18/196,807, filed on May 12, 2023, and a continuation-in-part of application No. 18/196,936, filed on May 12, 2023, and a continuation-in-part of application No. 18/196,765, filed on May 12, 2023, and a continuation-in-part of application No. 18/196,931, filed on May 12, 2023, and a continuation-in-part of application No. 18/196,912, filed on May 12, 2023, and a continuation-in-part of application No. 18/196,944, filed on May 12, 2023, which is a continuation-in-part of application No. 18/134,950, filed on Apr. 14, 2023, said application No. 18/196,912 is a continuation-in-part of application No. 18/134,950, filed on Apr. 14, 2023, said application No. 18/196,807 is a continuation-in-part of application No. 18/134,950, filed on Apr. 14, 2023, said application No. 18/196,936 is a continuation-in-part of application No. 18/134,950, filed on Apr. 14, 2023, said application No. 18/196,786 is a continuation-in-part of application No. 18/134,950, filed on Apr. 14, 2023, said application No. 18/196,931 is a continuation-in-part of application No. 18/134,950, filed on Apr. 14, 2023, said application No. 18/196,765 is a continuation-in-part of application No. 18/134,950, filed on Apr. 14, 2023, said application No. 18/196,944 is a continuation-in-part of application No. 18/130,285, filed on Apr. 3, 2023, said application No. 18/196,912 is a continuation-in-part of application No. 18/130,285, filed on Apr. 3, 2023, said application No. 18/196,786 is a continuation-in-part of application No. 18/130,285, filed on Apr. 3, 2023, said application No. 18/196,931 is a continuation-in-part of application No. 18/130,285, filed on Apr. 3, 2023, said application No. 18/196,936 is a continuation-in-part of application No. 18/130,285, filed on Apr. 3, 2023, said application No. 18/196,807 is a continuation-in-part of application No. 18/130,285, filed on Apr. 3, 2023, said application No. 18/196,765 is a continuation-in-part of application No. 18/130,285, filed on Apr. 3, 2023, which is a continuation-in-part of application No. 17/990,491, filed on Nov. 18, 2022, which is a continuation-in-part of application No. 17/957,881, filed on Sep. 30, 2022, and a continuation-in-part of application No. 17/941,907, filed on Sep. 9, 2022, which is a continuation-in-part of application No. 17/940,898, filed on Sep. 8, 2022, said application No. 17/957,881 is a continuation-in-part of application No. 17/857,920, filed on Jul. 5, 2022, said application No. 17/940,898 is a continuation-in-part of application No. 17/857,920, filed on Jul. 5, 2022, said application No. 17/957,881 is a continuation-in-part of application No. 17/846,625, filed on Jun. 22, 2022, said application No. 17/857,920 is a continuation-in-part of application No. PCT/US2022/024653, filed on Apr. 13, 2022, and a continuation of application No. 17/541,703, filed on Dec. 3, 2021, said application No. 18/134,950 is a continuation of application No. 17/534,061, filed on Nov. 23, 2021, now Pat. No. 11,665,658, said application No. 17/857,920 is a continuation of application No. 17/534,061, filed on Nov. 23, 2021, now Pat. No. 11,665,658, said application No. 17/541,703 is a continuation-in-part of application No. 17/408,156, filed on Aug. 20, 2021, now Pat. No. 11,737,121, and a continuation-in-part of application No. 17/233,107, filed on Apr. 16, 2021, now Pat. No. 11,726,162, and a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778.

(60) Provisional application No. 63/344,445, filed on May 20, 2022.

(51) Int. Cl.
*G01S 13/58* (2006.01)
*G01S 13/62* (2006.01)

(52) U.S. Cl.
CPC ... *H04W 56/0015* (2013.01); *H04W 56/0035* (2013.01); *H04W 56/005* (2013.01)

(56) References Cited

U.S. PATENT DOCUMENTS

| | | |
|---|---|---|
| 4,399,531 A | 8/1983 | Grande et al. |
| 4,806,934 A | 2/1989 | Magoon |
| 5,835,482 A | 11/1998 | Allen |
| 5,898,902 A | 4/1999 | Tuzov |
| 6,008,758 A | 12/1999 | Campbell |
| 6,072,425 A | 6/2000 | Vopat |
| 6,115,394 A | 9/2000 | Balachandran et al. |
| 6,195,403 B1 | 2/2001 | Anderson et al. |
| 6,496,940 B1 | 12/2002 | Horst et al. |
| 6,611,773 B2 | 8/2003 | Przydatek et al. |
| 6,662,229 B2 | 12/2003 | Passman et al. |
| 6,718,174 B2 | 4/2004 | Vayanos |
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,272,472 B1 | 9/2007 | McElreath |
| 7,299,013 B2 | 11/2007 | Rotta et al. |
| 7,343,170 B1 | 3/2008 | Feeney et al. |
| 7,417,948 B2 | 8/2008 | Sjöblom |
| 7,418,343 B1 | 8/2008 | McGraw et al. |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,639,652 B1 | 12/2009 | Amis et al. |
| 7,679,551 B2 | 3/2010 | Petovello et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |
| 8,010,287 B1 | 8/2011 | Frank et al. |
| 8,036,224 B2 | 10/2011 | Axelsson et al. |
| 8,121,741 B2 | 2/2012 | Taft et al. |

(56) References Cited

U.S. PATENT DOCUMENTS

| | | |
|---|---|---|
| 8,138,626 B2 | 3/2012 | Jonsson et al. |
| 8,159,397 B2 | 4/2012 | Feller et al. |
| 8,159,954 B2 | 4/2012 | Larsson et al. |
| 8,217,836 B1 | 7/2012 | Anderson et al. |
| 8,218,550 B2 | 7/2012 | Axelsson et al. |
| 8,223,660 B2 | 7/2012 | Allan et al. |
| 8,223,868 B2 | 7/2012 | Lee |
| 8,341,289 B2 | 12/2012 | Hellhake et al. |
| 8,369,445 B2 | 2/2013 | Hensley |
| 8,396,686 B2 | 3/2013 | Song et al. |
| 8,490,175 B2 | 7/2013 | Barton et al. |
| 8,553,560 B2 | 10/2013 | Axelsson et al. |
| 8,599,956 B1 | 12/2013 | Mitchell |
| 8,614,997 B1 | 12/2013 | Herder |
| 8,630,291 B2 | 1/2014 | Shaffer et al. |
| 8,638,008 B2 | 1/2014 | Baldwin et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,849,596 B2 | 9/2014 | Ting et al. |
| 8,867,427 B2 | 10/2014 | Taori et al. |
| 8,880,001 B1 | 11/2014 | Hwang et al. |
| 8,909,471 B1 | 12/2014 | Jinkins et al. |
| 8,913,543 B2 | 12/2014 | Zainaldin |
| 8,942,197 B2 | 1/2015 | Rudnick et al. |
| 8,964,739 B1 | 2/2015 | Wisehart |
| 8,989,326 B2 | 3/2015 | An et al. |
| 9,075,126 B2 | 7/2015 | Robinson |
| 9,179,475 B2 | 11/2015 | Koleszar et al. |
| 9,213,387 B2 | 12/2015 | King et al. |
| 9,246,795 B2 | 1/2016 | Madaiah et al. |
| 9,264,126 B2 | 2/2016 | Foster et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,345,029 B2 | 5/2016 | Monte et al. |
| 9,355,564 B1 | 5/2016 | Tyson et al. |
| 9,430,947 B2 | 8/2016 | Richardson et al. |
| 9,435,884 B2 | 9/2016 | Inoue |
| 9,516,513 B2 | 12/2016 | Saegrov et al. |
| 9,523,761 B1 | 12/2016 | Hoffmann et al. |
| 9,544,162 B2 | 1/2017 | Vasseur et al. |
| 9,621,208 B1 | 4/2017 | Snodgrass et al. |
| 9,628,285 B2 | 4/2017 | Császár |
| 9,693,330 B1 | 6/2017 | Snodgrass et al. |
| 9,696,407 B1 | 7/2017 | Greenleaf et al. |
| 9,713,061 B2 | 7/2017 | Ruiz et al. |
| 9,719,803 B2 | 8/2017 | Ratcliff et al. |
| 9,766,339 B2 | 9/2017 | Robinson et al. |
| 9,858,822 B1 | 1/2018 | Gentry |
| 9,883,348 B1 | 1/2018 | Walker et al. |
| 9,979,462 B2 | 5/2018 | Watson et al. |
| 9,979,635 B2 | 5/2018 | Hellhake et al. |
| 10,067,199 B2 | 9/2018 | Eldridge et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,236,648 B2 | 3/2019 | Irons et al. |
| 10,257,655 B2 | 4/2019 | Cody |
| 10,365,376 B2 | 7/2019 | Lee et al. |
| 10,382,897 B1 | 8/2019 | Lanes et al. |
| 10,455,521 B2 | 10/2019 | Hudson et al. |
| 10,459,074 B1 * | 10/2019 | Omer .................... G01S 13/003 |
| 10,484,837 B2 | 11/2019 | Navalekar et al. |
| 10,509,130 B2 | 12/2019 | Snyder et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,620,296 B1 | 4/2020 | Ezal et al. |
| 10,622,713 B2 | 4/2020 | Ma |
| 10,650,688 B1 | 5/2020 | DeRoche |
| 10,719,076 B1 | 7/2020 | Gavrilets et al. |
| 10,785,672 B2 | 9/2020 | Kwan et al. |
| 10,798,053 B2 | 10/2020 | Nolan et al. |
| 10,838,070 B1 | 11/2020 | Chapman et al. |
| 10,871,575 B2 | 12/2020 | Petrovic et al. |
| 10,873,429 B1 | 12/2020 | Kwon et al. |
| 10,908,277 B1 | 2/2021 | Roggendorf et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,073,622 B2 | 7/2021 | Cohen |
| 11,082,324 B2 | 8/2021 | Ramanathan et al. |
| 11,129,078 B2 | 9/2021 | Yates et al. |
| 11,258,520 B2 | 2/2022 | Goergen et al. |
| 11,284,295 B1 | 3/2022 | Kwon et al. |
| 11,290,942 B2 | 3/2022 | Kwon et al. |
| 11,411,613 B2 | 8/2022 | Jorgenson et al. |
| 11,415,664 B2 | 8/2022 | Hammes et al. |
| 11,443,638 B2 | 9/2022 | Byxbe |
| 11,500,111 B2 | 11/2022 | Frederiksen et al. |
| 11,528,675 B2 * | 12/2022 | Nagaraja ............... H04L 5/0048 |
| 11,536,850 B2 | 12/2022 | Sharma et al. |
| 2002/0018448 A1 | 2/2002 | Amis et al. |
| 2003/0035589 A1 | 2/2003 | Kim |
| 2003/0151513 A1 | 8/2003 | Herrmann et al. |
| 2004/0012859 A1 | 1/2004 | Minefuji |
| 2004/0028016 A1 | 2/2004 | Billhartz |
| 2004/0123228 A1 | 6/2004 | Kikuchi et al. |
| 2004/0213239 A1 | 10/2004 | Lin et al. |
| 2004/0246902 A1 | 12/2004 | Weinstein et al. |
| 2005/0025076 A1 | 2/2005 | Chaudhuri et al. |
| 2006/0010170 A1 | 1/2006 | Lashley et al. |
| 2006/0056421 A1 | 3/2006 | Zaki |
| 2007/0086541 A1 | 4/2007 | Moon et al. |
| 2007/0097880 A1 | 5/2007 | Rajsic |
| 2007/0109182 A1 | 5/2007 | Budic |
| 2007/0109979 A1 | 5/2007 | Fu et al. |
| 2007/0223497 A1 | 9/2007 | Elson et al. |
| 2007/0299950 A1 | 12/2007 | Kulkarni |
| 2008/0107034 A1 | 5/2008 | Jetcheva et al. |
| 2008/0117904 A1 | 5/2008 | Radha et al. |
| 2008/0219204 A1 | 9/2008 | Lee et al. |
| 2008/0273582 A1 | 11/2008 | Gaal et al. |
| 2008/0291945 A1 | 11/2008 | Luo |
| 2008/0310325 A1 | 12/2008 | Yang |
| 2009/0086713 A1 | 4/2009 | Luo |
| 2009/0271054 A1 | 10/2009 | Dokken |
| 2009/0290572 A1 | 11/2009 | Gonia et al. |
| 2009/0318138 A1 | 12/2009 | Zeng et al. |
| 2010/0074101 A1 | 3/2010 | Skalecki et al. |
| 2010/0074141 A1 | 3/2010 | Nguyen |
| 2011/0006913 A1 | 1/2011 | Chen et al. |
| 2011/0013487 A1 | 1/2011 | Zhou et al. |
| 2011/0188378 A1 | 8/2011 | Collins et al. |
| 2011/0312279 A1 | 12/2011 | Tsai et al. |
| 2012/0092208 A1 | 4/2012 | LeMire et al. |
| 2012/0098699 A1 | 4/2012 | Calmettes et al. |
| 2013/0006834 A1 | 1/2013 | Waelbroeck et al. |
| 2013/0069834 A1 | 3/2013 | Duerksen |
| 2013/0094366 A1 | 4/2013 | Lee et al. |
| 2013/0100942 A1 | 4/2013 | Rudnick et al. |
| 2013/0195017 A1 | 8/2013 | Jamadagni et al. |
| 2013/0197835 A1 | 8/2013 | Jonsson et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0029704 A1 | 1/2014 | Becker |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2014/0292568 A1 | 10/2014 | Fleming et al. |
| 2015/0010153 A1 | 1/2015 | Robertson |
| 2015/0025818 A1 | 1/2015 | Das et al. |
| 2015/0222479 A1 | 8/2015 | Kim et al. |
| 2015/0296335 A1 | 10/2015 | Joshi et al. |
| 2015/0326689 A1 | 11/2015 | Leppänen et al. |

(56) References Cited

U.S. PATENT DOCUMENTS

| | | |
|---|---|---|
| 2016/0139241 A1 | 5/2016 | Holz et al. |
| 2016/0150465 A1 | 5/2016 | Jung et al. |
| 2016/0187458 A1* | 6/2016 | Shah ............... H04W 4/02 |
| | | 455/456.1 |
| 2016/0189381 A1 | 6/2016 | Rhoads |
| 2016/0373997 A1 | 12/2016 | Petersen et al. |
| 2017/0111266 A1 | 4/2017 | Ko |
| 2017/0111771 A1 | 4/2017 | Haque et al. |
| 2017/0134227 A1 | 5/2017 | Song et al. |
| 2017/0149658 A1 | 5/2017 | Rimhagen et al. |
| 2018/0013665 A1 | 1/2018 | Ko et al. |
| 2018/0026475 A1 | 1/2018 | Gelonese et al. |
| 2018/0098263 A1 | 4/2018 | Luo et al. |
| 2018/0146489 A1 | 5/2018 | Jin et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0317207 A1 | 10/2019 | Schroder et al. |
| 2019/0349172 A1 | 11/2019 | Zhang |
| 2020/0011968 A1 | 1/2020 | Hammes et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0292706 A1* | 9/2020 | Hexsel .............. G01S 17/58 |
| 2020/0350983 A1 | 11/2020 | Alasti et al. |
| 2020/0371247 A1 | 11/2020 | Marmet |
| 2020/0396708 A1 | 12/2020 | Bharadwaj et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2021/0302956 A1* | 9/2021 | Sudhakaran ......... G05D 1/0287 |
| 2021/0359752 A1 | 11/2021 | Wang et al. |
| 2021/0385879 A1 | 12/2021 | Mahalingam et al. |
| 2021/0405176 A1 | 12/2021 | Luo |
| 2022/0015101 A1 | 1/2022 | Gallagher et al. |
| 2022/0021702 A1 | 1/2022 | Bouthemy |
| 2022/0030511 A1* | 1/2022 | Wang ............... H04W 40/24 |
| 2022/0038139 A1 | 2/2022 | Löwenmark et al. |
| 2022/0060959 A1* | 2/2022 | Atungsiri ............ H04W 36/32 |
| 2022/0069901 A1 | 3/2022 | Tian et al. |
| 2022/0085892 A1* | 3/2022 | Sorge ............... H04B 10/524 |
| 2022/0086818 A1 | 3/2022 | Nam et al. |
| 2022/0094634 A1 | 3/2022 | Kwon et al. |
| 2022/0143428 A1 | 5/2022 | Goetz et al. |
| 2022/0159741 A1 | 5/2022 | Hoang et al. |
| 2022/0173799 A1 | 6/2022 | Wigard et al. |
| 2022/0198351 A1 | 6/2022 | Beaurepaire et al. |
| 2022/0268916 A1 | 8/2022 | Nagpal |
| 2022/0286254 A1 | 9/2022 | Cha et al. |
| 2022/0317290 A1 | 10/2022 | Kostanic et al. |
| 2022/0334211 A1 | 10/2022 | Loren et al. |
| 2022/0342027 A1 | 10/2022 | Loren et al. |
| 2022/0360320 A1 | 11/2022 | Miao et al. |
| 2022/0365165 A1 | 11/2022 | Kirchner et al. |
| 2022/0368410 A1 | 11/2022 | Ma et al. |
| 2022/0413118 A1 | 12/2022 | Starr et al. |
| 2023/0033690 A1 | 2/2023 | Factor et al. |
| 2023/0057666 A1 | 2/2023 | Kwon et al. |
| 2023/0081728 A1 | 3/2023 | Kwon et al. |
| 2023/0111316 A1 | 4/2023 | Ma et al. |
| 2023/0118153 A1 | 4/2023 | Amorim et al. |
| 2023/0133633 A1 | 5/2023 | Park et al. |
| 2023/0135149 A1 | 5/2023 | Krishnamurthy et al. |

FOREIGN PATENT DOCUMENTS

| | | |
|---|---|---|
| CN | 101330448 B | 12/2010 |
| CN | 101465793 B | 2/2011 |
| CN | 202257277 U | 5/2012 |
| CN | 103067286 B | 6/2016 |
| CN | 107645417 A | 1/2018 |
| CN | 110234147 A | 9/2019 |
| CN | 115085799 A | 9/2022 |
| CN | 115688598 A | 2/2023 |
| DE | 102010010935 A1 | 9/2011 |
| EP | 0908022 A2 | 4/1999 |
| EP | 1912392 A2 | 4/2008 |
| EP | 2208084 A4 | 11/2011 |
| EP | 2743726 A1 | 6/2014 |
| EP | 2466964 B1 | 12/2017 |
| EP | 3026961 B1 | 8/2020 |
| GB | 2441610 B | 12/2011 |
| GB | 2542491 A | 3/2017 |
| GB | 2568122 B | 11/2019 |
| GB | 2598610 A | 3/2022 |
| IN | 101686179 B | 1/2013 |
| JP | 4290684 B2 | 7/2009 |
| JP | 5164157 B2 | 3/2013 |
| KR | 1020040107702 A | 12/2004 |
| KR | 100568976 B1 | 4/2006 |
| KR | 1020060078814 A | 7/2006 |
| KR | 101231707 B1 | 2/2013 |
| KR | 1020160071964 A | 6/2016 |
| RU | 2718131 C1 | 3/2020 |
| WO | 2008157609 A3 | 3/2009 |
| WO | 2012062091 A1 | 5/2012 |
| WO | 2012165938 A1 | 12/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |
| WO | 2019045767 A1 | 3/2019 |
| WO | 2020117427 A1 | 6/2020 |
| WO | 2020165627 A1 | 8/2020 |
| WO | 2020220233 A1 | 11/2020 |
| WO | 2021251902 A1 | 12/2021 |
| WO | 2022003386 A1 | 1/2022 |
| WO | 2022202858 A1 | 9/2022 |
| WO | 2022221429 A1 | 10/2022 |
| WO | 2022232336 A1 | 11/2022 |
| WO | 2022233042 A1 | 11/2022 |
| WO | 2022233314 A1 | 11/2022 |
| WO | 2023001520 A1 | 1/2023 |
| WO | 2023030622 A1 | 3/2023 |
| WO | 2023031904 A1 | 3/2023 |
| WO | 2023047336 A1 | 3/2023 |
| WO | 2023057655 A1 | 4/2023 |
| WO | 2023067552 A1 | 4/2023 |
| WO | 2023068990 A1 | 4/2023 |
| WO | 2023081918 A1 | 5/2023 |

OTHER PUBLICATIONS

U.S. Appl. No. 17/408,156, filed Aug. 20, 2021, Tj T. Kwon.
U.S. Appl. No. 17/534,061, filed Nov. 23, 2021, William B. Sorsby.
U.S. Appl. No. 17/857,920, filed Jul. 5, 2022, Eric J. Loren.
U.S. Appl. No. 63/344,445, filed May 20, 2022, Eric J. Loren.
U.S. Appl. No. 16/369,398, filed Mar. 29, 2019, Kwon.
U.S. Appl. No. 16/987,671, filed Aug. 7, 2021, Kwon et al.
U.S. Appl. No. 17/233,107, filed Apr. 16, 2022, Loren et al.
U.S. Appl. No. 17/541,703, filed Dec. 3, 2021, Kwon et al.
U.S. Appl. No. 17/857,920, filed Jul. 5, 2022, Loren et al.
DSSS in a Nutshell, Basics of Design, Research & Design Hub, Sep. 14, 2020.
Extended Search Report for European Application No. 21188737.7 dated Dec. 10, 2021, 8 pages.
Extended Search Report in European Application No. 21190368.7 dated Jan. 5, 2022, 10 pages.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Martorella, M. et al., Ground Moving Target Imaging via SDAP-ISAR Processing: Review and New Trends. Sensors 2021, 21, 2391. https://doi.org/10.3390/s21072391.
Peng Wang, et al., "Convergence of Satellite and Terrestrial Networks: A Comprehensive Survey networks" IEEEAcess; vol. 4, Dec. 31, 2019.

(56) References Cited

OTHER PUBLICATIONS

Pulak K. Chowdhury, et al. "Handover Schemes in Satellite Networks: State-of-the-Art and Future Research Directions" 4th Quarter 2006, vol. 8, No. 4, Oct. 1, 2006.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
Yi et al., "Passive Clustering in Ad Hoc Networks (PC)", URL: https://tools.ietf,org/html/drafts-yi-manet-pc-00, Nov. 14, 2001, 31 pages.
Seddigh M et al: "Dominating sets and neighbor elimination-based broadcasting algorithms in wireless networks", vol. 13, No. 1, Jan. 1, 2002, pp. 14-25.
Turgut D. et al: "Optimizing clustering algorithm in mobile ad hoc networks using simulated annealing", vol. 3, Mar. 16, 20023, pp. 1492-1497.
Extended European Search Report dated Apr. 4, 2024; European Application No. 21190368.7.

* cited by examiner

DOPPLER NULLING SPATIAL AWARENESS (DNSA) SOLUTIONS FOR NON-TERRESTRIAL NETWORKS

CROSS-REFERENCE TO RELATED APPLICATIONS

The present application is related to and claims priority from the following U.S. patent applications:

(a) U.S. patent application Ser. No. 17/233,107, filed Apr. 16, 2021, which is incorporated by reference in its entirety;
(b) PCT Patent Application No. PCT/US22/24653, filed Apr. 13, 2022, which claims priority to U.S. patent application Ser. No. 17/233,107, filed Apr. 16, 2021, all of which are incorporated by reference in its entirety;
(c) U.S. patent application Ser. No. 17/408,156, filed Aug. 20, 2021, which claims priority to U.S. patent application Ser. No. 17/233,107, filed Apr. 16, 2021, all of which are incorporated by reference in its entirety;
(d) U.S. patent application Ser. No. 17/541,703, filed Dec. 3, 2021, which is incorporated by reference in its entirety, which claims priority to:
  U.S. patent application Ser. No. 17/408,156, filed Aug. 20, 2021, which is incorporated by reference in its entirety; and
  U.S. patent application Ser. No. 17/233,107, filed Apr. 16, 2021, all of which is incorporated by reference in its entirety;
(e) U.S. patent application Ser. No. 17/534,061, filed Nov. 23, 2021, which is incorporated by reference in its entirety;
(f) U.S. Patent Application No. 63/344,445, filed May 20, 2022, which is incorporated by reference in its entirety;
(g) U.S. patent application Ser. No. 17/857,920, filed Jul. 5, 2022, which is incorporated by reference in its entirety;
(h) U.S. Patent Application No. 63/400,138, filed Aug. 23, 2022, which is incorporated by reference in its entirety;
(i) U.S. patent application Ser. No. 17/940,898, filed Sep. 8, 2022, which is incorporated by reference in its entirety;
(j) U.S. patent application Ser. No. 17/941,907, filed Sep. 9, 2022, which is incorporated by reference in its entirety;
(k) U.S. patent application Ser. No. 17/957,881, filed Sep. 30, 2022, which is incorporated by reference in its entirety;
(l) U.S. patent application Ser. No. 17/990,491, filed Nov. 18, 2022, which is incorporated by reference in its entirety;
(m) U.S. patent application Ser. No. 18/130,285, filed Apr. 3, 2023, which is herein incorporated by reference in its entirety;
(n) U.S. patent application Ser. No. 18/134,950, filed Apr. 14, 2023, which is incorporated by reference in its entirety;
(o) U.S. patent application Ser. No. 18/196,807, filed May 12, 2023, which is incorporated by reference in its entirety;
(p) U.S. patent application Ser. No. 18/196,912, filed May 12, 2023, which is incorporated by reference in its entirety;
(q) U.S. patent application Ser. No. 18/196,931, filed May 12, 2023, which is incorporated by reference in its entirety;
(r) U.S. patent application Ser. No. 18/196,765, filed May 12, 2023, which is incorporated by reference in its entirety;
(s) U.S. patent application Ser. No. 18/196,944, filed May 12, 2023, which is incorporated by reference in its entirety;
(t) U.S. patent application Ser. No. 18/196,786, filed May 12, 2023, which is incorporated by reference in its entirety;
(u) U.S. patent application Ser. No. 18/196,936, filed May 12, 2023, which is incorporated by reference in its entirety;
(v) U.S. patent application Ser. No. 18/198,025, filed May 16, 2023, which is incorporated by reference in its entirety;
(w) U.S. patent application Ser. No. 18/198,152, filed May 16, 2023, which is incorporated by reference in its entirety; and
(x) U.S. patent application Ser. No. 18/198,671, filed May 17, 2023, which is incorporated by reference in its entirety.

BACKGROUND

Terrestrial and non-terrestrial network (NTN) communications are converging into multi-level networks. For example, 5G communications networks may rely on converged terrestrial and NTN communications supported by airborne and/or satellite platforms, such that two terrestrial 5G cellular users may connect to each other via an NTN base station. These non-terrestrial communications nodes, however, are in constant motion: either relative to each other, relative to stationary terrestrial communications nodes, or both. In some cases, the relative velocities between nodes may be sufficiently fast, and relative distances between nodes sufficiently long, that converged network topologies and corresponding communications links may be in a state of near constant change. Accordingly, efficient routing of communications traffic, as well as efficient reuse of limited spectrum resources, may be difficult if not impossible without the ability to maintain situational awareness in a highly dynamic network environment.

SUMMARY

In an aspect, a system of at least a transmitter (Tx) node and a receiver (Rx) node of a converged network including terrestrial and non-terrestrial network components and nodes is disclosed. Each node includes a communications interface with antenna elements for transmission and reception and a controller with one or more processors, each controller having knowledge of own-node velocity and own-node orientation. At least the Tx and Rx nodes are in relative motion (e.g., one or both nodes may actually be in motion) with respect to a common inertial reference frame known to both nodes prior to any transmission or reception between the nodes. At least one of the Tx and Rx nodes is a non-terrestrial node operating in or aboard a non-terrestrial platform, e.g., beyond earth atmosphere or beyond earth orbit. The Tx and Rx nodes are time synchronized to apply one or more Doppler corrections associated with each node's own motion relative to the common reference frame. Based on the applied Doppler corrections, at least one of the Tx and Rx nodes determines a bearing between the two nodes, e.g., relative to the common reference frame.

In some embodiments, the common reference frame is an inertial reference frame associated with an earth-centered or earth-fixed coordinate system.

In some embodiments, the non-terrestrial platform is a low earth orbit (LEO) satellite operating at an orbital altitude between 500 and 1,500 km.

In some embodiments, at least one of the Tx and Rx nodes includes directional antenna elements.

In some embodiments, the directional antenna elements are steerable by the controller based on the determined relative bearing, e.g., to track or maintain a directional communications link with a non-terrestrial node.

In some embodiments, one of the Tx and Rx nodes is a terrestrial node operating in or aboard a terrestrial platform and including omnidirectional antenna elements. The non-terrestrial node is one of a group of non-terrestrial nodes, all time synchronized with the terrestrial node to apply Doppler corrections based on their own node motions, and the terrestrial node tracks the group of non-terrestrial nodes by determining a relative bearing to one or more of the group of non-terrestrial nodes based on the Doppler corrections.

In some embodiments, the terrestrial node is configured for operation in or aboard a fixed-location ground station, surface or water-based vehicle, or airborne platform operating in the earth's atmosphere.

In some embodiments, at least one of the Tx and Rx nodes determine a range between the two nodes based on two-way timing and ranging (TWTR) exchanges based on the determined relative bearing between the two nodes.

In some embodiments, the non-terrestrial node operates aboard an LEO satellite at an operating altitude around 500 to 1,500 km, and the terrestrial node determines ephemeris data for the LEO satellite based on multiple determinations of the relative bearing and range.

In some embodiments, the non-terrestrial node is an extra-terrestrial node operating in an extra-terrestrial environment, e.g., beyond earth orbit or beyond the earth's atmosphere, and the determined bearing is relative to a non-Earth-centered coordinate system and/or non-Earth-centered common inertial reference frame.

In some embodiments, the extra-terrestrial node is engaged in space flight operations relative to one or more non-Earth solar system objects (e.g., the sun, earth's moon, planets and dwarf planets, satellites or said planets and dwarf planets, comets, and/or asteroids.)

In some embodiments, the non-Earth-centered coordinate system is based on the associated non-Earth solar system object (e.g., solar coordinates, lunar coordinates, Martian coordinates).

In some embodiments, the extra-terrestrial node is one of a group of extra-terrestrial nodes operating in the extra-terrestrial environment, and the non-Earth-centered coordinate system is based on an extra-terrestrial node of the group.

In some embodiments, space flight operations in the extra-terrestrial environment include flyby or orbital operations with respect to the non-Earth solar system object.

In some embodiments, space flight operations in the extra-terrestrial environment include landing or surface-based operations with respect to the non-Earth solar system object.

In some embodiments, space flight operations in the extra-terrestrial environment include space flight from the Earth to the non-Earth solar system object or space flight between two non-Earth solar system objects.

In some embodiments, at least one of the Tx and Rx nodes (e.g., a terrestrial and extra-terrestrial node; two extra-terrestrial nodes) adjusts its Doppler corrections to correct for relativistic time dilation and/or relativistic length contraction, which may affect nulling angles relevant to Doppler correction or the timing of simultaneous Doppler corrections between the nodes.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment", "in embodiments" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments of the inventive concepts disclosed herein are directed to methods and systems for implementing Doppler null scanning (DNS) and/or Doppler nulling spatial awareness (DNSA) across non-terrestrial networks (NTN) and/or converged networks incorporating both terrestrial and non-terrestrial nodes. For example, converged networks may include, in addition to terrestrial network elements (e.g., base stations, user equipment, ground-based communications nodes having a fixed location relative to the earth, and correspondingly relative to earth-centered inertial reference frames and/or coordinate systems), air-based networks and nodes as well as space-based networks and nodes. For example, air-based network nodes may include crewed or uncrewed air-based platforms and aircraft as well as near-space platforms (NSP) operating at higher atmospheric altitudes.

Converged networks may further include space-based networks and platforms, e.g., satellites and constellations thereof. For example, geostationary or geosynchronous orbit satellites (GEO) may orbit the earth through an orbital period matching the earth's rotation; geostationary orbit satellites, in particular, maintain a geosynchronous orbit in the equatorial plane and therefore appear to maintain a fixed location relative to terrestrial communications equipment. Middle-earth orbit (MEO) and low-earth orbit (LEO) satellites operate at lower altitudes (e.g., 10,000-20,000 km and 500-1,500 km respectively) and may trade a decrease in coverage area for a decrease in propagation delay. Embodiments of the inventive concepts disclosed herein may facilitate integration of non-terrestrial network nodes, particularly space-based platforms, into converged networks by providing efficient spatial awareness throughout the network based on Doppler shift corrections between network nodes as described below.

It is noted that U.S. patent application Ser. No. 17/857,920, filed Jul. 5, 2022 (particularly FIGS. 1 through 7 thereof, and accompanying text), is at least partially reproduced by at least some (or all) of the illustrations of FIG. 1 and at least some (or all) of the corresponding language for FIG. 1. For example, at least some examples of Doppler nulling methods and systems may be better understood, in a nonlimiting manner, by reference to FIG. 1 and accompanying text. Such embodiments and examples are provided for illustrative purposes and are not to be construed as necessarily limiting. For instance, in embodiments the transmitter node may be stationary rather than moving and/or vice versa. Moreover, and stated for purposes of navigating the disclosure only and not to be construed as limiting, descriptions that may relate to other language not necessarily reproduced from U.S. patent application Ser. No. 17/857,920 include the discussion and figures after FIG. 1.

Figure 1:
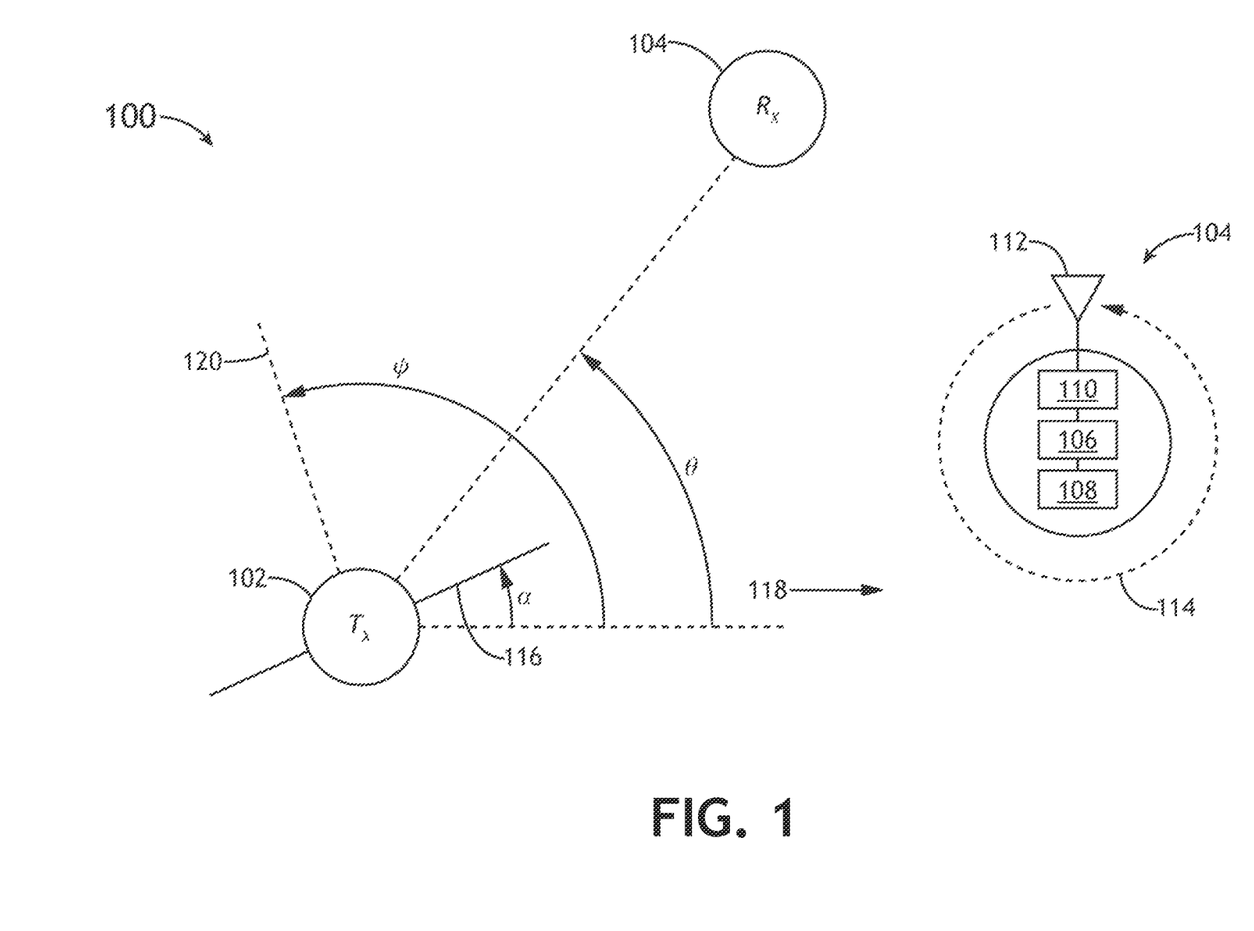
FIG. 1 is a diagrammatic illustration of two nodes in a simplified mobile ad hoc network (MANET) and individual nodes thereof according to example embodiments of this disclosure.

FIG. 1—DNS Foundation

Referring generally to FIG. 1, in some embodiments, a stationary receiver may determine a cooperative transmitter's direction and velocity vector by using a Doppler null scanning approach in two dimensions. A benefit of the approach is the spatial awareness without exchanging explicit positional information. Other benefits include discovery, synchronization, and Doppler corrections which are important for communications. Some embodiment may combine coordinated transmitter frequency shifts along with the transmitter's motion induced Doppler frequency shift to produce unique net frequency shift signal characteristics resolvable using a stationary receiver to achieve spatial awareness. Further, some embodiment may include a three-dimensional (3D) approach with the receiver and the transmitter in motion.

Some embodiments may use analysis performed in a common reference frame (e.g., a common inertial reference frame, such as the Earth, which may ignore the curvature of Earth), and it is assumed that the communications system for each of the transmitter and receiver is informed by the platform of its own velocity and orientation. The approach described herein can be used for discovery and tracking, but the discussion here focuses on discovery which is often the most challenging aspect.

The meaning of the 'Doppler Null' can be explained in part through a review of the two-dimensional (2D) case without the receiver motion, and then may be expounded on by a review of adding the receiver motion to the 2D case, and then including receiver motion in the 3D case.

The Doppler frequency shift of a communications signal is proportional to the radial velocity between transmitter and receiver, and any significant Doppler shift is typically a hindrance that should be considered by system designers. In contrast, some embodiments utilize the Doppler effect to discriminate between directions with the resolution dictated by selected design parameters. Furthermore, such embodiments use the profile of the net frequency shift as the predetermined 'Null' direction scans through the angle space. The resultant profile is sinusoidal with an amplitude that provides the transmitter's speed, a zero net frequency shift when the 'Null' direction aligns with the receiver, and a minimum indicating the direction of the transmitter's velocity. It should be noted that that the transmitter cannot correct for Doppler in all directions at one time so signal characteristics are different in each direction and are different for different transmitter velocities as well. It is exactly these characteristics that the receiver uses to determine spatial awareness. The received signal has temporal spatial characteristics that can be mapped to the transmitter's direction and velocity. This approach utilizes the concept of a 'Null' which is simply the direction where the transmitter perfectly corrects for its own Doppler shift. The same 'Nulling' protocol runs on each node and scans through all directions, such as via a scanning sequence of a protocol. Here we arbitrarily illustrate the scanning with discrete successive steps of 10 degrees but in a real system; however, it should be understood that any suitable step size of degrees may be used for Doppler null scanning.

As already mentioned, one of the contributions of some embodiments is passive spatial awareness. Traditionally, spatial information for neighbor nodes (based on a global positioning system (GPS) and/or gyros and accelerometers) can be learned via data communication. Unfortunately, spatial awareness via data communication, referred to as active spatial awareness is possible only after communication has already been established, not while discovering those neighbor nodes. Data communication is only possible after the signals for neighbor nodes have been discovered, synchronized and Doppler corrected. In contrast, in some embodiments, the passive spatial awareness described herein may be performed using only synchronization bits associated with acquisition. This process can be viewed as physical layer overhead and typically requires much lower bandwidth compared to explicit data transfers. The physical layer overheads for discovery, synchronization and Doppler correction have never been utilized for topology learning for upper layers previously.

Traditionally, network topology is harvested via a series of data packet exchanges (e.g., hello messaging and link status advertisements). Passive spatial awareness may eliminate hello messaging completely and provide a wider local topology which is beyond the coverage of hello messaging. By utilizing passive spatial awareness, highly efficient mobile ad hoc networking (MANET) is possible. Embodiments may improve the functioning of a network itself.

Passive spatial awareness may provide benefits above and beyond MANET or communications implementations, however. For example, situational awareness via Doppler null scanning may be applied to fixed-receiver and mobile-transmitter as well as fixed-transmitter and mobile-receiver systems (e.g., replacing TACAN, TCAS, VOR/DME, and other radionavigational beacons and stations), or systems where both transmitters and receivers are mobile (e.g., friend/foe identification and station-keeping between mobile platforms).

Referring to FIG. 1, a multi-node network 100 is disclosed. The multi-node network 100 may include multiple communications nodes, e.g., a transmitter (Tx) node 102 and a receiver (Rx) node 104.

In embodiments, the multi-node network 100 may include any multi-node network known in the art. For example, the multi-node network 100 may include a mobile ad-hoc network (MANET) in which the Tx and Rx nodes 102, 104 (as well as every other communications node within the multi-node network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios (such as on a vehicle or on a person), mobile phones, smart phones, tablets, smart watches, laptops, and the like. In embodiments, the Rx node 104 of the multi-node network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104 (or even less than a full 360-degree arc).

In embodiments, the Tx node 102 and Rx node 104 may one or both be moving in an arbitrary direction at an arbitrary speed, and may similarly be moving relative to each other. For example, the Tx node 102 may be moving relative to the Rx node 104 according to a velocity vector 116 ($|\vec{V_T}|$), at a relative velocity $V_T$ and a relative angular direction (an angle $\alpha$ relative to an arbitrary direction 118 (e.g., due east); $\theta$ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle $\phi$ relative to the arbitrary direction 118). The transmitting waveform (e.g., the communications interface 110 of the Tx node 102) may be informed by the platform (e.g., the controller 106) of its velocity vector and orientation (e.g., $\alpha$, $|\vec{V_T}|$) and may adjust its transmitting frequency to remove the Doppler frequency shift at each Doppler nulling direction 120 and angle $\phi$.

To illustrate aspects of some embodiments, we show the 2D dependence of the net frequency shift for a stationary receiver as a function of Null direction across the horizon, as shown in a top-down view of FIG. 1, where the receiver node 104 is stationary and positioned $\theta$ from east relative to the transmitter, the transmitter node 102 is moving with a speed $|\vec{V_T}|$ and direction $\alpha$ from east and a snapshot of the scanning $\phi$ which is the 'Null' direction, exemplarily shown as 100 degrees in this picture.

The Doppler shift is a physical phenomenon due to motion and can be considered as a channel effect. In this example the transmitter node 102 is the only moving object, so it is the only source of Doppler shift. The Doppler frequency shift as seen by the receiver node 104 due to the transmitter node 102 motion is:

$$\frac{\Delta f_{DOPPLER}}{f} = \frac{|\vec{V_T}|}{c}\cos(\theta - \alpha),$$

where c is the speed of light.

The other factor is the transmitter frequency adjustment term that should exactly compensate the Doppler shift when the 'Null' direction aligns with the receiver direction. It is the job of the transmitter node 102 to adjust its transmit frequency according to its own speed ($|\vec{V_T}|$), and velocity direction $\alpha$. That transmitter frequency adjustment ($\Delta f_T$) is proportional to the velocity projection onto the 'Null' direction $\phi$ (120) and is:

$$\frac{\Delta f_T}{f} = -\frac{|\vec{V_T}|}{c}\cos(\varphi - \alpha).$$

The net frequency shift seen by the receiver is the sum of the two terms:

$$\frac{\Delta f_{net}}{f} = \frac{|\vec{V_T}|}{c}[\cos(\theta - \alpha) - \cos(\varphi - \alpha)].$$

It is assumed that the velocity vector and the direction changes slowly compared to the periodic measurement of $\Delta f_{net}$. Under those conditions, the unknown parameters (from the perspective of the receiver node 104) of $\alpha$, $|\vec{V_T}|$, and $\theta$ are constants.

Furthermore, it is assumed that the receiver node 104 has an implementation that resolves the frequency of the incoming signal, as would be understood to one of ordinary skill in the art.

Examples of Doppler nulling methods include, but are not limited to, methods and other descriptions (e.g., at least some theory and mathematical basis) are disclosed in U.S. patent application Ser. No. 17/233,107, filed Apr. 16, 2021, which is hereby incorporated by reference in its entirety; U.S. patent application Ser. No. 17/534,061, filed Nov. 23, 2021, which is hereby incorporated by reference in its entirety; and U.S. patent application Ser. No. 17/857,920, filed Jul. 5, 2022, which is hereby incorporated by reference in its entirety. In embodiments, doppler nulling methods allow for benefits such as, but not limited to, relatively quickly and/or efficiently detecting transmitter nodes and determining transmitter node attributes (e.g., transmitter node speed, transmitter node bearing, relative bearing of transmitter node relative to receiver node, relative distance of transmitter node relative to receiver node, and the like).

Figure 2:
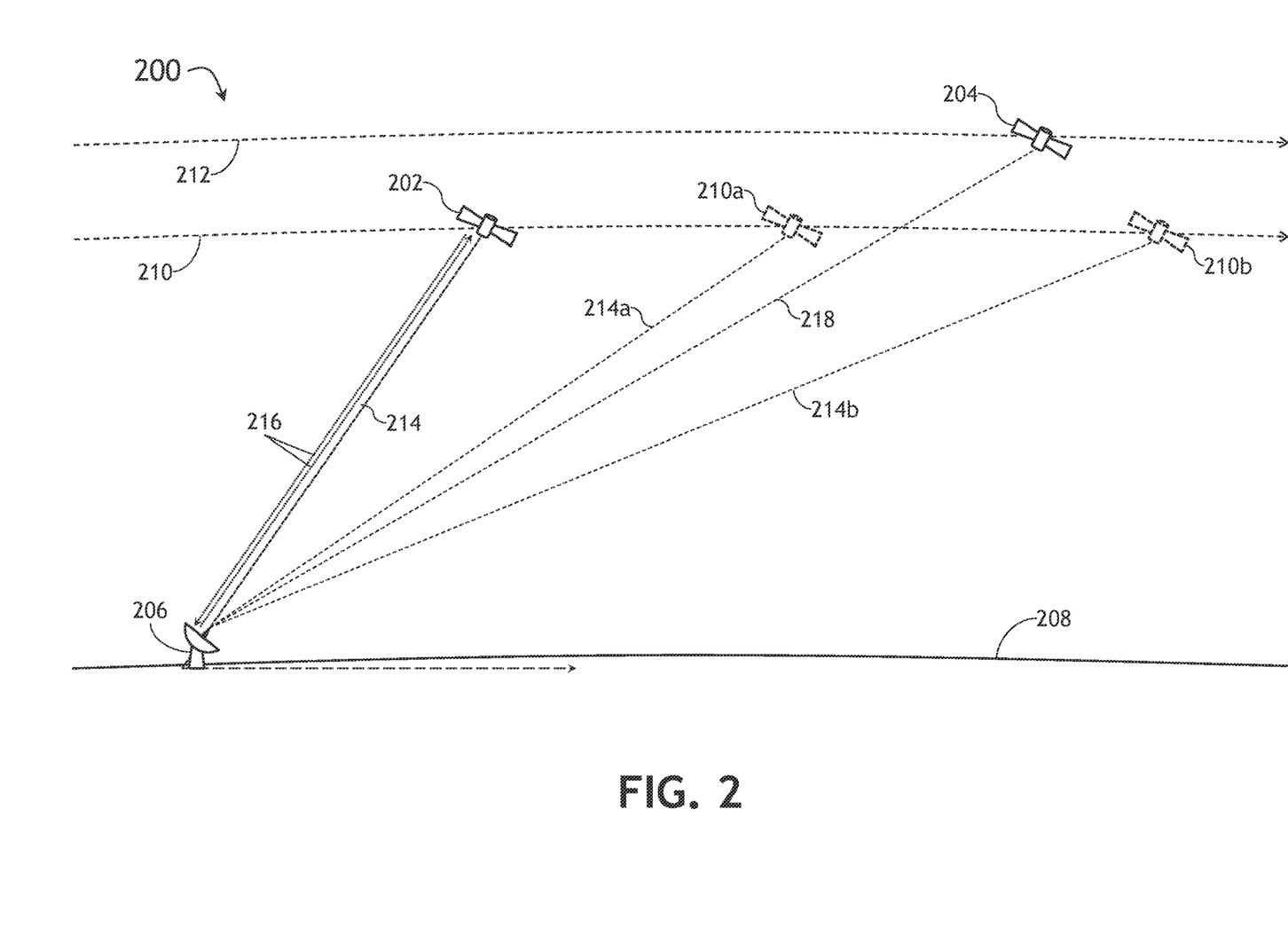
FIG. 2 is a diagrammatic illustration of a converged network of nodes including both terrestrial and non-terrestrial network nodes according to example embodiments of this disclosure.

FIG. 2—Converged Network

Referring now to FIG. 2, the converged network 200 may be implemented and may operate similarly to the multi-node network 100 of FIG. 1, except that the converged network 200 may incorporate non-terrestrial networks (NTN) and non-terrestrial nodes, e.g., LEO satellites 202, 204, in addition to terrestrial nodes 206.

In embodiments, either of the Tx node (102, FIG. 1) or the Rx node (104, FIG. 1) may be a non-terrestrial node configured for operation aboard a non-terrestrial platform, while the other node may be a terrestrial node 206 configured for operation in or aboard a terrestrial platform. For example, the terrestrial platform may be a ground-based communications station having a fixed location with reference to earth-based or earth-centered coordinate systems or inertial reference frames. In some embodiments, the terrestrial platform may likewise be in motion relative to the earth 208 (e.g., as described above, when relative motion involves motion on the part of both the Tx and Rx nodes 102, 104). For example, the terrestrial node 206 may be embodied in, or configured for operation aboard, a ground-based vehicle or mobile platform, an air-based platform (e.g., a crewed or uncrewed aircraft operating in the earth's atmosphere beneath the thermopause), and/or water-based platform or ground effect vehicle operating in or on a terrestrial body of water. In some embodiments, the distinction between terrestrial nodes 206 and non-terrestrial nodes (e.g., LEO satellites 202, 204) may be defined according to other means of distinguishing the earth's atmosphere from outer space, e.g., the thermopause (c. 500-600 km) or the Kármán line (c. 100 km).

In embodiments, the non-terrestrial nodes may include LEO satellites 202, orbiting the earth (208) along an orbital path 210, 212 at a particular altitude beyond the thermopause (e.g., at an orbital period of 128 minutes or less). As the velocity of LEO satellites 202, 204 relative to the earth 208 may be rather high due to their relatively low altitude, the LEO satellites may come in and out of optimal communications range of the terrestrial node 206 with relative speed.

In embodiments, the terrestrial node 206 and LEO satellite 202 may perform Doppler shift corrections (e.g., in the frequency and/or time domains) as described above and thereby determine a bearing 214 between the terrestrial node and the LEO satellite, e.g., relative to a common reference frame known to both the terrestrial node and LEO satellite prior to transmissions or receptions by either node.

In some embodiments, the antenna elements (112, FIG. 1) of the terrestrial node 206 (e.g., and/or non-terrestrial nodes) may include steerable directional antenna elements. For example, the terrestrial node 206 may determine a relative bearing 214 to the LEO satellite 202 at a time t(1); however, as the LEO satellite proceeds through its orbital path 210, e.g., to positions 210a and 210b at subsequent times t(2) and t(3), the relative bearing 214 may likewise shift (214a, 214b). Accordingly, once the terrestrial node 206 has determined the relative bearing 214 to the LEO satellite 202 and established a directional communications link to the LEO satellite based on the determined bearing, the controller (106, FIG. 1) of the terrestrial node 206 may steer the directional antenna elements 112 to maintain the directional communications link as the relative bearing 214 shifts (214a-214b), e.g., until the LEO satellite 202 passes out of optimal range.

In some embodiments, once the relative bearing 214 has been established between the terrestrial node 206 and LEO satellite 202, the terrestrial node and LEO satellite may perform precise two-way timing and ranging (TWTR) exchanges 216 based on the determined relative bearing 214 to establish a precise range or distance between the terrestrial node and the LEO satellite 202. For example, the determined range or distance may correspond to a particular time of validity corresponding as closely as possible to the time t(1) at which the relative bearing 214 was determined. In some embodiments, as the LEO satellite 202 travels relative to the terrestrial node 206, and the range or distance between the LEO satellite and terrestrial node decreases or increases (e.g., as the LEO satellite approaches, passes over/passes by, and travels away from the terrestrial node), the communications interface (110, FIG. 1) of the terrestrial node and/or the LEO satellite may increase or decrease transmitting power, antenna gain, required signal-to-noise ratio (SNR) (e.g., adjusting signal modulation schemes accordingly) and/or receiving power with respect to the directional communications link between the terrestrial node and LEO satellite.

In some embodiments, the antenna elements 112 of the terrestrial node 206 and/or non-terrestrial nodes may include omnidirectional antenna elements. For example, omnidirectional antenna elements may enable the terrestrial node 206 to determine a relative bearing 214, 218 to multiple LEO satellites 202, 204 and track both satellites along their respective orbital paths 210, 212. In embodiments, based on the determined relative bearings 214, 218 (e.g., and/or range/distance between the terrestrial node 206 and each LEO satellite), the terrestrial node may select from a set of candidate LEO satellites 202, 204 an optimal satellite with which to establish a directional communications link. In some embodiments, the terrestrial node 206 may maintain relative bearing 214, 218 and/or ranging information with multiple LEO satellites 202, 204, performing a seamless handover by first establishing a directional communications link to the LEO satellite 204 (e.g., based on the determined relative bearing 218) and, when the LEO satellite 204 may no longer be in optimal range for transmission, establishing a new directional communications link to the LEO satellite 202 (which may be at a more favorable relative bearing 214 and/or range) and terminating the prior directional communications link to the LEO satellite 204 once the subsequent directional communications link has been established.

In some embodiments, the terrestrial node 206 may determine ephemeris data of one or more LEO satellites 202, 204 based on determined relative bearings 214, 214a-214b, 218 and ranging information over multiple bearing and range measurements of a particular LEO satellite. For example, ephemeris data corresponding to the LEO satellite 202 may be used by the terrestrial node 206 to determine or predict a likely position of the LEO satellite at a particular time t(n) based on its orbital path 210 and determined relative bearings 214, 214a, 214b at known times t(1), t(2), t(3). In embodiments, predictions of the future position and/or trajectory of the LEO satellite 202 may assist the terrestrial node 206 in discovering, and establishing a directional communications link to, the LEO satellite 202 when the satellite is likely to be in position for optimal transmission and reception.

Figure 3:
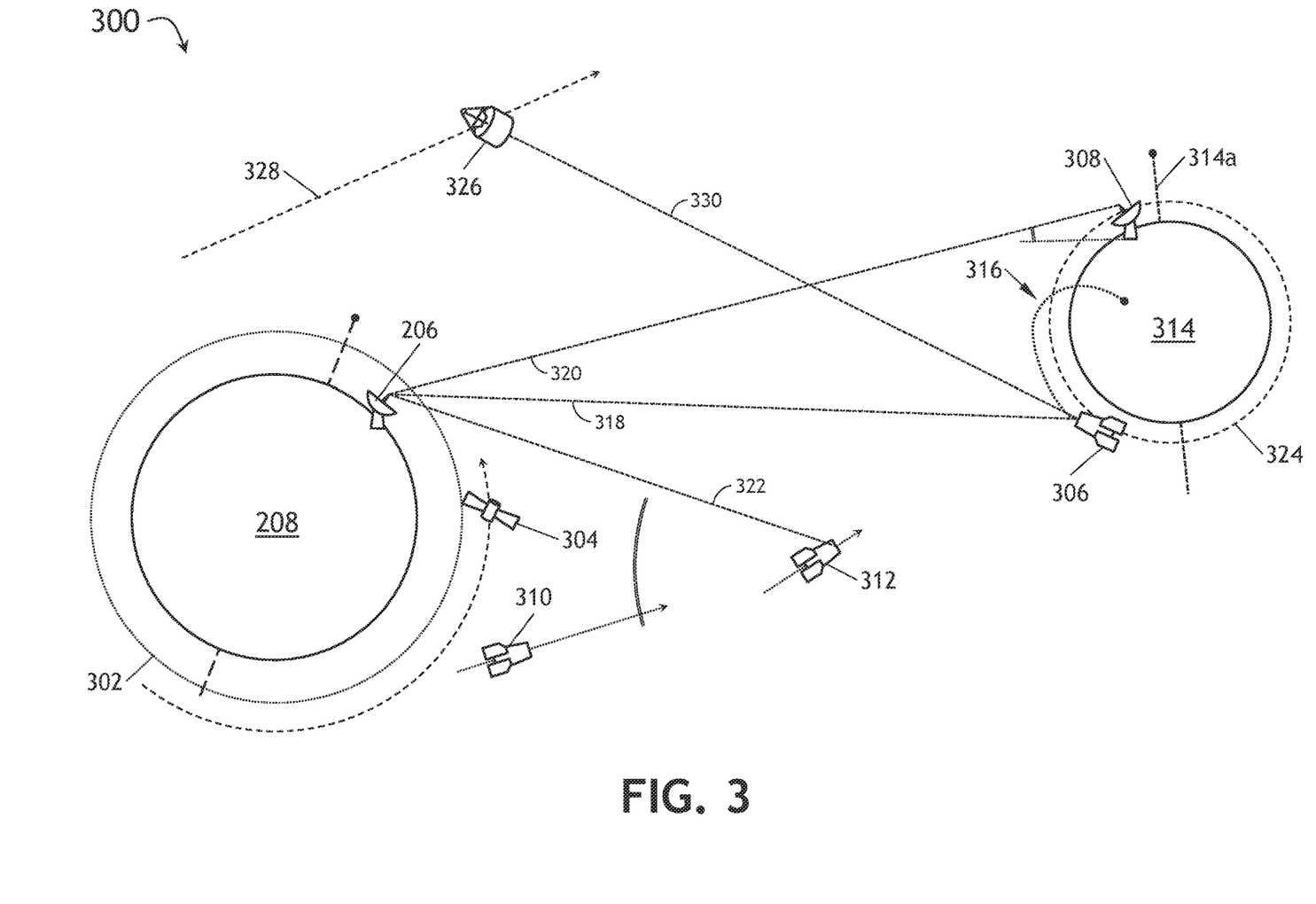
FIG. 3 is a diagrammatic illustration of non-terrestrial network nodes operating in an extraterrestrial environment according to example embodiments of this disclosure.

FIG. 3—Extraterrestrial Operations and Non-Earth-Centered Reference

Referring now to FIG. 3, the converged network 300 may be implemented and may operate similarly to the converged network 200 of FIG. 2, except that the converged network 300 may incorporate one or more of the non-terrestrial nodes (e.g., selected from the Tx and/or Rx nodes (102, 104; FIG. 1)) as extra-terrestrial nodes operating in an extra-terrestrial environment such that relative motion and/or bearings may be determined relative to a non-Earth-centered coordinate system and/or a non-Earth-centered inertial reference frame.

In embodiments, the converged network 300 may include, in addition to terrestrial nodes 206, one or more extra-terrestrial nodes (e.g., extra-terrestrial platforms) configured for operation in extra-terrestrial environments. For example, terrestrial nodes 206 may include Tx or Rx nodes 102, 104 configured for operation on the surface of the earth 208, e.g., ground-based fixed stations or vehicles, water-based or ground-effect mobile platforms operating in or on terrestrial bodies of water, and/or airborne mobile platforms operating in the earth's atmosphere below the thermopause 302. Similarly, non-terrestrial nodes may include, in addition to satellites 304 in earth orbit beyond the thermopause 302 (or, e.g., the Kármán line, depending on the preferred distinction between terrestrial nodes 206 and non-terrestrial nodes, the latter including LEO satellites 202, 204, FIG. 2), extra-terrestrial nodes in operation beyond earth orbit, or beyond the outer limits of the earth's atmosphere. For example, extra-terrestrial nodes may include mobile platforms 306, 308, 310, 312 engaged in space flight operations beyond earth orbit and associated with one or more non-Earth solar system objects.

Non-Earth solar system objects may include, but are not limited to, the earth's moon 314, the sun, other planets and/or dwarf planets within the solar system, satellites orbiting said planets and/or dwarf planets, a barycenter or Lagrange point of a system of two or more solar system objects (one of which may be the earth 208), manmade objects existing within the solar system, asteroids, comets, and/or objects associated with the Kuiper Belt or Oort cloud.

In embodiments, when the converged network 300 includes terrestrial nodes 206 and one or more extra-terrestrial nodes 306, 308, 310, 312 performing Doppler corrections based on motion of one or both nodes relative to a coordinate system and/or common reference frame, the coordinate system or common reference frame may not be an earth-centered or earth-fixed coordinate system but may instead be based upon a relevant non-Earth solar system object (or a feature or aspect thereof, e.g., lunar axis 314a or solar axis). For example, the extra-terrestrial nodes 306, 308 may be engaged in space flight operations in an extra-terrestrial environment, e.g., the extra-terrestrial node 306 engaged in orbital operations (which may include landing operations 316) with respect to the moon 314 and the extra-terrestrial node 308 engaged in surface operations with respect to the moon.

In embodiments, the extra-terrestrial nodes 306, 308 may determine bearings 318, 320 to the terrestrial node 206 relative to a lunar coordinate system or inertial reference frame. It may be noted that while the terrestrial node 206 may be fixed in location relative to earth-centered coordinate systems and/or inertial reference frames, e.g., if the terrestrial node 206 is a fixed ground station, the terrestrial node 206 may be in motion relative to a lunar coordinate system. Similarly, the extra-terrestrial nodes 310, 312 may be engaged in space flight operations from the earth 208 to the moon 314 (or, e.g., between two other non-Earth solar system objects). Further, the space flight operations may include fly-by operations by one or more of the extra-terrestrial nodes 310, 312 with respect to the moon 314 or some other non-Earth solar system object. In embodiments, a group of extra-terrestrial nodes engaged in spaceflight between two solar system objects, e.g., between the earth 208 and the moon 314 where no other reference objects may be close by, may determine bearings to a terrestrial node 206 based on Doppler corrections relative to one of the extra-terrestrial nodes. For example, the extra-terrestrial node 312, one of a group of extra-terrestrial nodes 310, 312 inflight between the earth 208 and moon 314, may determine a bearing 322 to the terrestrial node 206 relative to the extra-terrestrial node 310.

In embodiments, the relative velocity between nodes of the converged network 300 may be sufficiently high that one or both nodes determining a relative bearing may adjust Doppler corrections based on their own-node movement relative to a non-Earth-centered coordinate system to correct for time dilation and/or length contraction due to special and/or general relativity. For example, the extra-terrestrial node 306, as noted above, may maintain a lunar orbit (324) while the extra-terrestrial node 326 may be a spacecraft in a solar orbit (328). Whether the non-Earth-centered coordinate system or inertial reference frame of choice is lunar-based or solar-based, the velocity vectors of each extra-terrestrial node 306, 326 relative to the coordinate system may differ significantly, resulting in high relative velocities. If, for example, relative velocities (or, e.g., relative gravitational attraction from a gravitating mass, such as the sun, which two nodes may orbit at different orbital radii) between the two extra-terrestrial nodes 306, 326 are sufficiently high, one or both extra-terrestrial nodes may experience relativistic skewing of the Doppler nulling angle φ being corrected (e.g., due to length contraction) and/or a precise time (e.g., due to time dilation), as measured aboard each node, when common Doppler null scanning measurements are made (as described above and as incorporated herein by reference). Accordingly, one or both extra-terrestrial nodes 306, 326 may adjust their Doppler corrections to correct for special and/or general relativistic effects in order to determine an accurate bearing 330 between the two nodes relative to the non-Earth-centered coordinate system.

Embodiments of the inventive concepts disclosed herein may provide for more efficient performance within converged networks by allowing nodes to determine and maintain situational awareness in a highly dynamic network environment characterized by high relative velocities and large distances between nodes (as well as frequent handovers associated with directional link communications due to frequent changes in topology) without exchanging data transmissions.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:
1. A system, comprising:
a transmitter (Tx) node and a receiver (Rx) node of an at least partially non-terrestrial network (NTN), wherein each node of the Tx node and the Rx node comprises:
a communications interface including at least one antenna element; and
a controller operatively coupled to the communications interface, the controller including one or more processors, wherein the controller has information of own-node velocity and own-node orientation;
wherein the Tx node and the Rx node are in motion relative to each other;
wherein each node of the Tx node and the Rx node are time synchronized to apply one or more Doppler corrections associated with each node's own motions relative to a common reference frame, the common reference frame known to the Tx node and the Rx node prior to the Tx node transmitting signals to the Rx node and prior to the Rx node receiving the signals from the Tx node,
wherein at least one of the Tx node or the Rx node is a non-terrestrial node configured for operation aboard a non-terrestrial platform;
and
wherein at least one of the Rx node or the Tx node is configured to determine a relative bearing between the Rx node and the Tx node based on the one or more Doppler corrections.

2. The system of claim 1, wherein the common reference frame is a stationary common inertial reference frame associated with an earth-centered coordinate system.

3. The system of claim 1, wherein the non-terrestrial platform is a low earth orbit (LEO) satellite operating at an altitude not more than 1,500 km.

4. The system of claim 1, wherein the at least one antenna element of each of the Tx and Rx nodes includes at least one directional antenna element.

5. The system of claim 4, wherein the at least one directional antenna element is steerable by the controller based on the at least one determined relative bearing.

6. The system of claim 1, wherein:
one of the Tx node or the Rx node is a terrestrial node configured for operation aboard a terrestrial platform;
wherein the at least one antenna element of the terrestrial node includes at least one omnidirectional antenna element;
wherein the non-terrestrial node is one of a plurality of non-terrestrial nodes;
and
wherein the terrestrial node and the plurality of non-terrestrial nodes are time synchronized to apply the one or more Doppler corrections associated with each node's own motions relative to the common reference frame;
and
wherein the terrestrial node is configured to determine a relative bearing between the terrestrial node and each of the plurality of non-terrestrial nodes based on the one or more Doppler corrections.

7. The system of claim 6, wherein the terrestrial platform includes at least one of:
a ground station having a fixed location on the earth's surface;
a terrestrial vehicle configured for operation on at least one of the earth's surface or a terrestrial body of water;
or
an air-based platform configured for operation in the earth's atmosphere.

8. The system of claim 1, wherein at least one of the Rx node or the Tx node is configured to determine a range between the Rx and Tx nodes based on at least one two-way timing and ranging (TWTR) exchange based on the determined relative bearing.

9. The system of claim 8, wherein:
the Tx node is configured for operation aboard a low earth orbit (LEO) satellite operating at an altitude not more than 1,500 km;
and
the Rx node is configured to determine ephemeris data corresponding to the LEO satellite based on the at least one determined bearing and the at least one determined range.

10. The system of claim 1, wherein:
the non-terrestrial node is an extra-terrestrial node configured for operation in an extra-terrestrial environment beyond the earth's atmosphere;
and
the determined relative bearing is relative to a non-Earth-based coordinate system.

11. The system of claim 10, wherein the extra-terrestrial node is configured for space flight operations relative to at least one non-Earth solar system object.

12. The system of claim 11, wherein the non-Earth-based coordinate system is based on the at least one non-Earth solar system object.

13. The system of claim 11, wherein:
the extra-terrestrial node is one of a plurality of extra-terrestrial nodes configured for operation in the extra-terrestrial environment;
and
the non-Earth-based coordinate system is based on an extra-terrestrial node of the plurality of extra-terrestrial nodes.

14. The system of claim 11, wherein the space flight operations relative to a non-Earth solar system object include at least one of:
flyby operations relative to the non-Earth solar system object;
or
orbital operations relative to the non-Earth solar system object.

15. The system of claim 11, wherein the space flight operations relative to a non-Earth solar system object include at least one of:
landing operations relative to the non-Earth solar system object;
or
surface operations relative to the non-Earth solar system object.

16. The system of claim 11, wherein the space flight operations relative to a non-Earth solar system object include at least one of:
space flight operations between Earth and the non-Earth solar system object;
and
space flight operations between the non-Earth solar system object and a second non-Earth solar system object.

17. The system of claim 10, wherein at least one of the Tx node and the Rx node are configured to adjust the one or more Doppler corrections based on at least one of relativistic time dilation or relativistic length contraction.

* * * * *